United States Patent
Croak et al.

(10) Patent No.: US 8,699,681 B2
(45) Date of Patent: *Apr. 15, 2014

(54) METHOD AND APPARATUS FOR MONITORING BLOCKED CALLS IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 809 days.

This patent is subject to a terminal disclaimer.

(21) Appl. No.: 12/647,477

(22) Filed: Dec. 26, 2009

(65) Prior Publication Data

US 2010/0104079 A1    Apr. 29, 2010

Related U.S. Application Data

(63) Continuation of application No. 11/136,004, filed on May 24, 2005, now Pat. No. 7,664,241.

(51) Int. Cl.
*H04M 1/56* (2006.01)
*H04M 15/00* (2006.01)
*H04M 3/42* (2006.01)

(52) U.S. Cl.
USPC ............. 379/142.02; 379/112.01; 379/133; 379/210.02

(58) Field of Classification Search
USPC ................. 379/88.19, 126, 210.02
See application file for complete search history.

(56) References Cited

U.S. PATENT DOCUMENTS

| | | | | |
|---|---|---|---|---|
| 4,306,295 A * | 12/1981 | Caroc | ............. | 708/650 |
| 4,733,364 A * | 3/1988 | Yamagata | ............. | 702/79 |
| 5,357,564 A | 10/1994 | Gupta et al. | | |
| 5,812,655 A | 9/1998 | Pickeral et al. | | |
| 5,822,400 A * | 10/1998 | Smith | ............. | 379/32.02 |
| 5,907,603 A * | 5/1999 | Gallagher et al. | ............. | 379/133 |
| 5,930,334 A * | 7/1999 | Lundberg et al. | ............. | 379/27.06 |
| 6,067,355 A | 5/2000 | Lim et al. | | |
| 6,130,937 A * | 10/2000 | Fotta | ............. | 379/200 |
| 6,418,212 B1 * | 7/2002 | Harrison et al. | ............. | 379/189 |
| 6,741,688 B1 * | 5/2004 | Yau | ............. | 379/142.01 |
| 6,781,959 B1 * | 8/2004 | Garakani et al. | ............. | 370/242 |
| 6,788,773 B1 | 9/2004 | Fotta | | |
| 7,031,450 B2 * | 4/2006 | Evslin | ............. | 379/220.01 |
| 7,136,636 B1 | 11/2006 | McLaughlin | | |
| 7,664,241 B1 | 2/2010 | Croak et al. | | |
| 2004/0001576 A1 * | 1/2004 | Wang et al. | ............. | 379/88.19 |
| 2004/0001579 A1 | 1/2004 | Feinberg et al. | | |
| 2004/0210524 A1 | 10/2004 | Benenati et al. | | |
| 2004/0218743 A1 * | 11/2004 | Hussain et al. | ............. | 379/201.11 |
| 2005/0129206 A1 | 6/2005 | Martin | | |
| 2006/0184842 A1 | 8/2006 | Boucher | | |
| 2006/0188080 A1 | 8/2006 | Terpstra et al. | | |
| 2006/0188081 A1 | 8/2006 | Hooper et al. | | |
| 2007/0047728 A1 * | 3/2007 | Raju et al. | ............. | 379/373.02 |

* cited by examiner

*Primary Examiner* — Joseph T Phan

(57) ABSTRACT

Method and apparatus for monitoring a communication network is described. In one example, call detail record data generated by network elements in the communication network is parsed to identify occurrence of a plurality of blocked calls over a time period. A plurality of consolidated call detail records for the plurality of blocked calls are respectively generated from the call detail record data. Each of the plurality of consolidated call detail records includes an originating telephone number. The originating telephone number of each of the plurality of consolidated call detail records is then processed to identify unique originating telephone numbers for the plurality of blocked calls.

20 Claims, 4 Drawing Sheets

METHOD AND APPARATUS FOR MONITORING BLOCKED CALLS IN A COMMUNICATION NETWORK

This application is a continuation of U.S. patent application Ser. No. 11/136,004, filed May 24, 2005 now U.S. Pat. No. 7,664,241, which is currently allowed and is herein incorporated by reference in its entirety.

BACKGROUND OF THE INVENTION

1. Field of the Invention

Embodiments of the present invention generally relate to telecommunications systems and, more particularly, to a method and apparatus for monitoring blocked calls in a communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VOIP) network.

The number of blocked calls in a communication network is an important indicator of service quality for both a provider's internal measurements, as well as for enterprise customers that may use the network for their customer's traffic (e.g., call centers). Typically, statistics related to blocked calls are determined by processing call detail records (CDRs). However, multiple CDRs are often generated for one blocked call. In addition, a number of persistent callers or automatic dialers may generate many hundreds of blocked calls. Thus, the service provider may not be able to accurately assess the true customer impact of blocked calls in the network. Accordingly, there exists a need in the art for an improved method and apparatus for monitoring blocked calls in a communication network.

SUMMARY OF THE INVENTION

Method and apparatus for monitoring a communication network is described. In one embodiment, call detail record data generated by network elements in the communication network is parsed to identify occurrence of a plurality of blocked calls over a time period. A plurality of consolidated call detail records for the plurality of blocked calls are respectively generated from the call detail record data. Each of the plurality of consolidated call detail records includes an originating telephone number. The originating telephone number of each of the plurality of consolidated call detail records is then processed to identify unique originating telephone numbers for the plurality of blocked calls.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
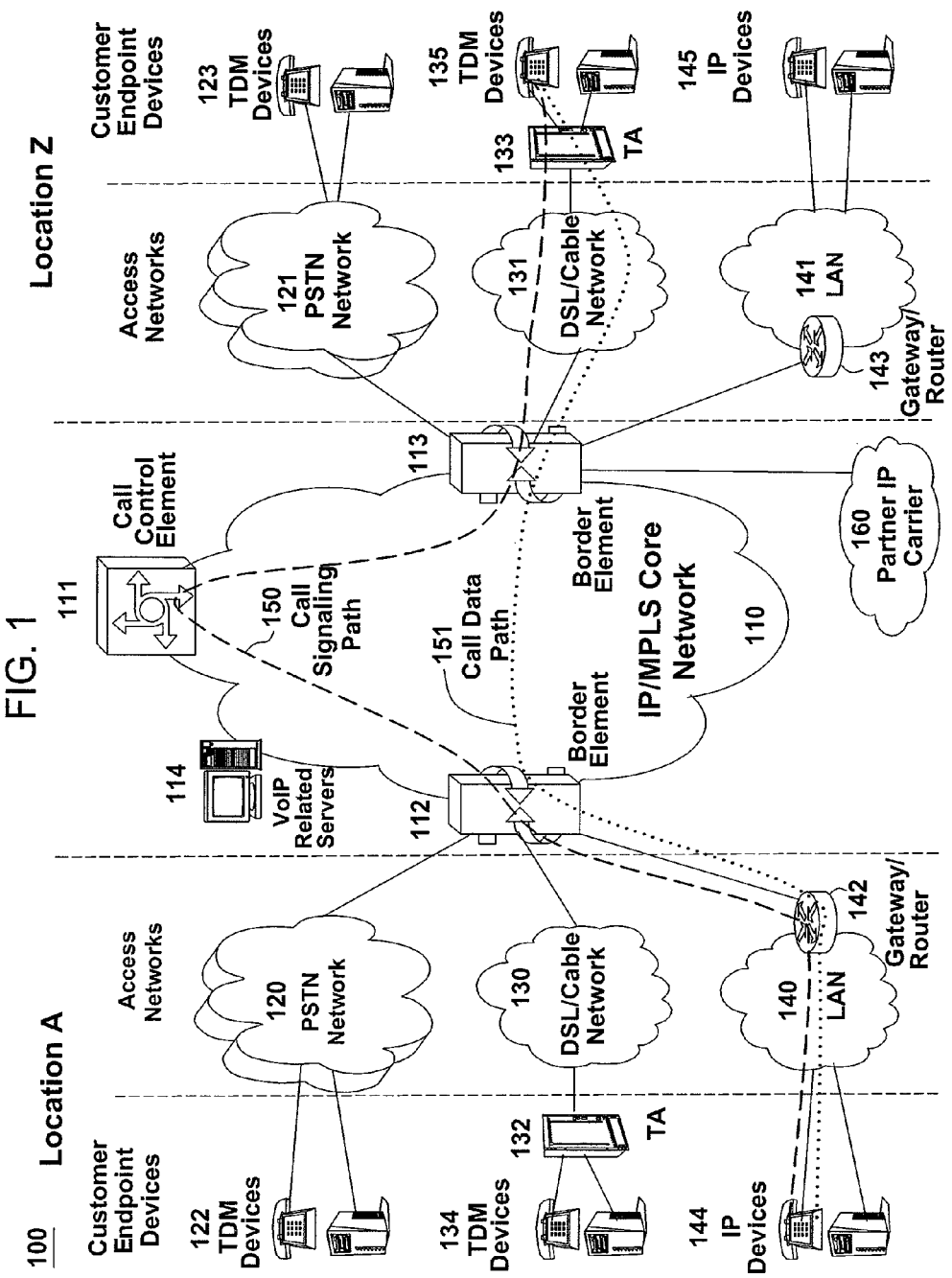
FIG. 1 is a block diagram depicting an exemplary embodiment of a communication system in accordance with the invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. BEs may also be referred to as "edge components." A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
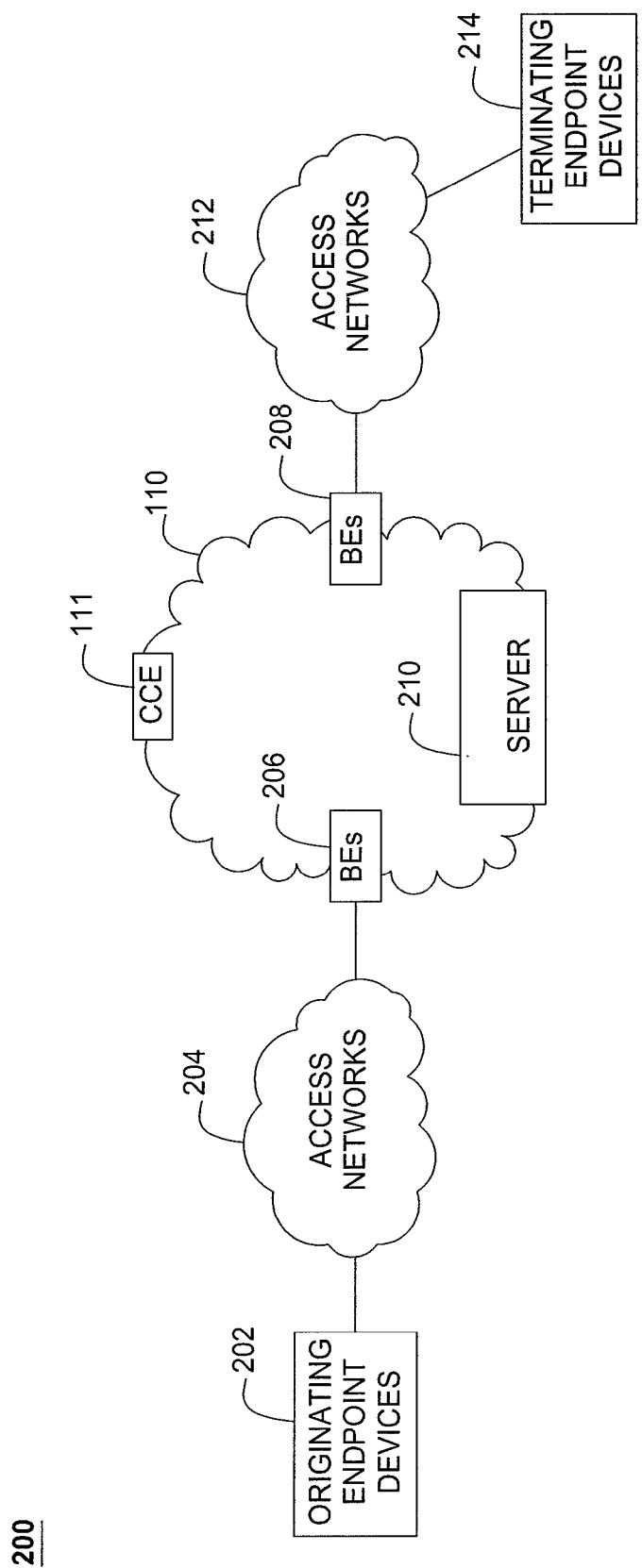
FIG. 2 is a block diagram depicting an exemplary configuration of the communication system of FIG. 1 constructed in accordance with the invention.

FIG. 2 is a block diagram depicting an exemplary configuration of the communication system of FIG. 1 constructed in accordance with the invention. In the present embodiment, originating endpoint devices 202 are configured for communication with the core network 110 via access networks 204 and border elements 206. Terminating endpoint devices 214 are configured for communication with the core network 110 via access networks 212 and border elements 208. The originating endpoint device 202 and the terminating endpoint device 214 may comprise any of the customer endpoint devices described above (e.g., TDM devices, IP devices, etc.). The access networks 204 and 212 may comprise any of the access networks described above (e.g., PSTN, DSL/Cable, LAN, etc).

The core network 110 may be in communication with a server 210. The server 210 is configured to collect call detail records (CDRs) from the network elements in the core network 110 (e.g., the BEs 206, the BEs 208, the CCE 111). Notably, various network elements in the core network 110 continuously generate CDRs for every call processed within the network. A CDR is data associated with a telephone call, including the originating telephone number, the dialed telephone number, the date and timestamp, the duration, the call setup delay, the final handling code of the telephone call, and like type parameters known in the art. The final handling code is the code that indicates whether a call has been completed successfully, blocked, cut-off, or the like. A call processed by the core network 110 creates at least one CDR at each network element involved in the call. A CDR created at BEs 206 and 208 for a particular call contains signaling and media information more related to the edge of the core network 110, whereas a CDR created by the CCE 111 for the same call contains signaling and media information more related to the core of the network 110. In one embodiment, a CDR is created on a per call basis. In other words, there is only one CDR created for a call for each network element involved in the call. As such, if multiple network elements are involved in the call, multiple CDRs are created for the call.

In one embodiment, the server 210 may request and receive CDRs from the network elements, such as the BEs 206, the BEs 208, and the CCE 111. In another embodiment, the network elements may forward CDRs to the server 210. In either embodiment, the server 210 is configured to process the CDRs to determine the number of blocked calls originated by a single unique telephone number, as well as the number of CDRs associated with a single blocked call. An exemplary embodiment of a method for monitoring a communication network that can be used by the server 210 is described below. In this manner, network engineers can evaluate the overall number of unique customer endpoints that were impacted by blocked calls.

Figure 3:
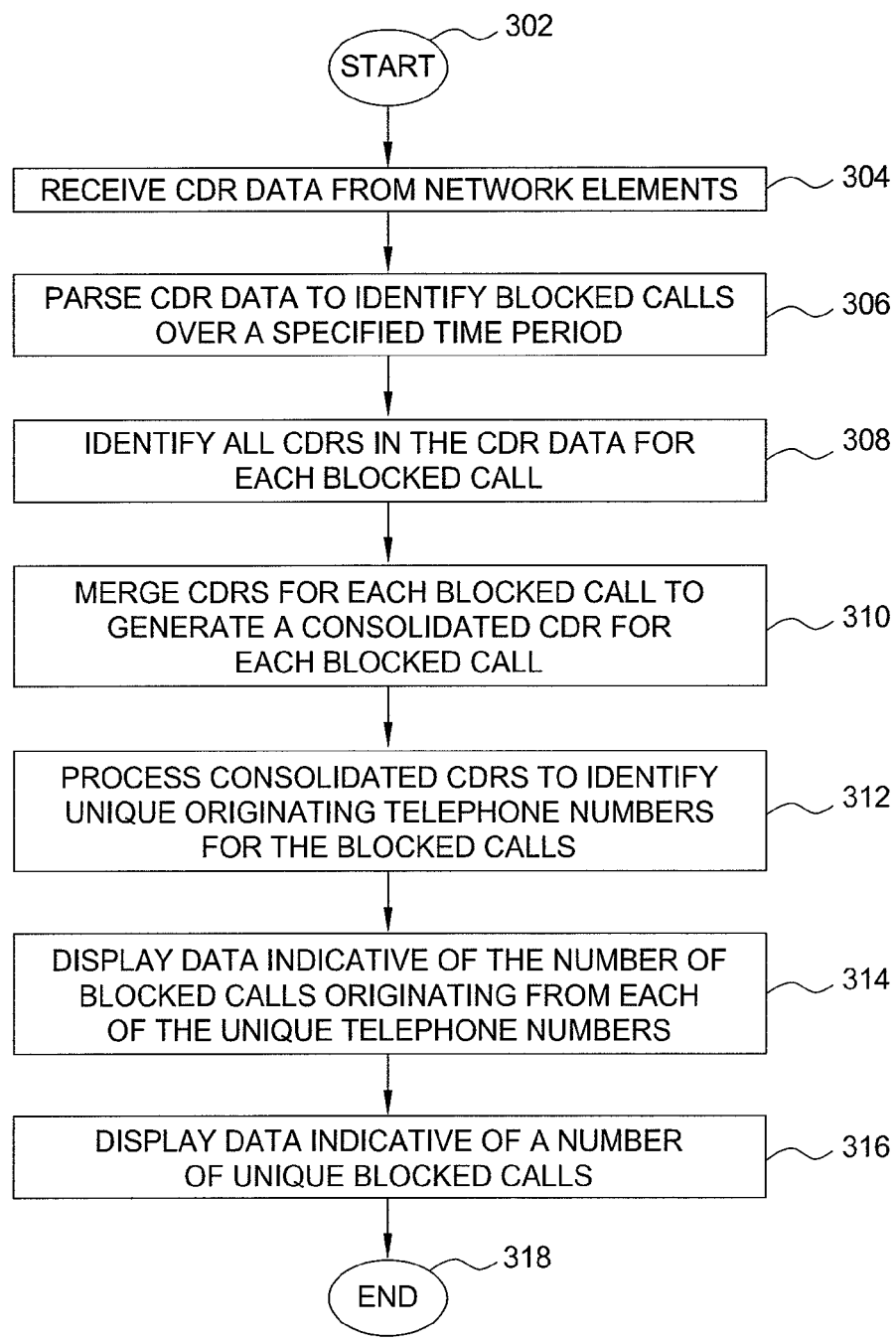
FIG. 3 is a flow diagram depicting an exemplary embodiment of a method for monitoring a communication network in accordance with one or more aspects of the invention.

FIG. 3 is a flow diagram depicting an exemplary embodiment of a method 300 for monitoring a communication network in accordance with one or more aspects of the invention. The method 300 begins at step 302. At step 304, CDR data is received from the network elements of the communication network. At step 306, the CDR data is parsed to identify blocked calls over a specified time period. In one embodiment, blocked calls are identified by examining the final handling code of CDRs in the CDR data. At step 308, all CDRs in the CDR data for each of the blocked calls are identified. That is, groups of CDRs respectively associated with the blocked calls are identified. At step 310, CDRs for each blocked call are merged to generate a consolidated CDR for each blocked call. For example, if a given blocked call generated three CDRs (e.g., CDRs generated by two BEs and a CCE), then a single consolidated CDR is generated for the blocked call by merging the data of the three CDRs. Notably, each consolidated CDR includes an originating telephone number. Redundant data among a merged group of CDRs may be dropped from the consolidated CDR, whereas unique data among the merged group of CDRs may be saved as part of the consolidated CDR. For example, each CDR for a given blocked call may include the same originating telephone number, but different signaling and media information based on which network element generated the CDR.

At step 312, the consolidated CDRs are processed to identify unique originating telephone numbers for the blocked calls. That is, originating numbers in the consolidated CDRs are examined and redundant originating numbers are ignored to produce a set of unique originating numbers. At step 314, data indicative of the number of blocked calls originating from each of the unique telephone numbers may be displayed. At step 316, data indicative of a number of unique blocked calls may be displayed. The method 300 ends at step 318.

Figure 4:
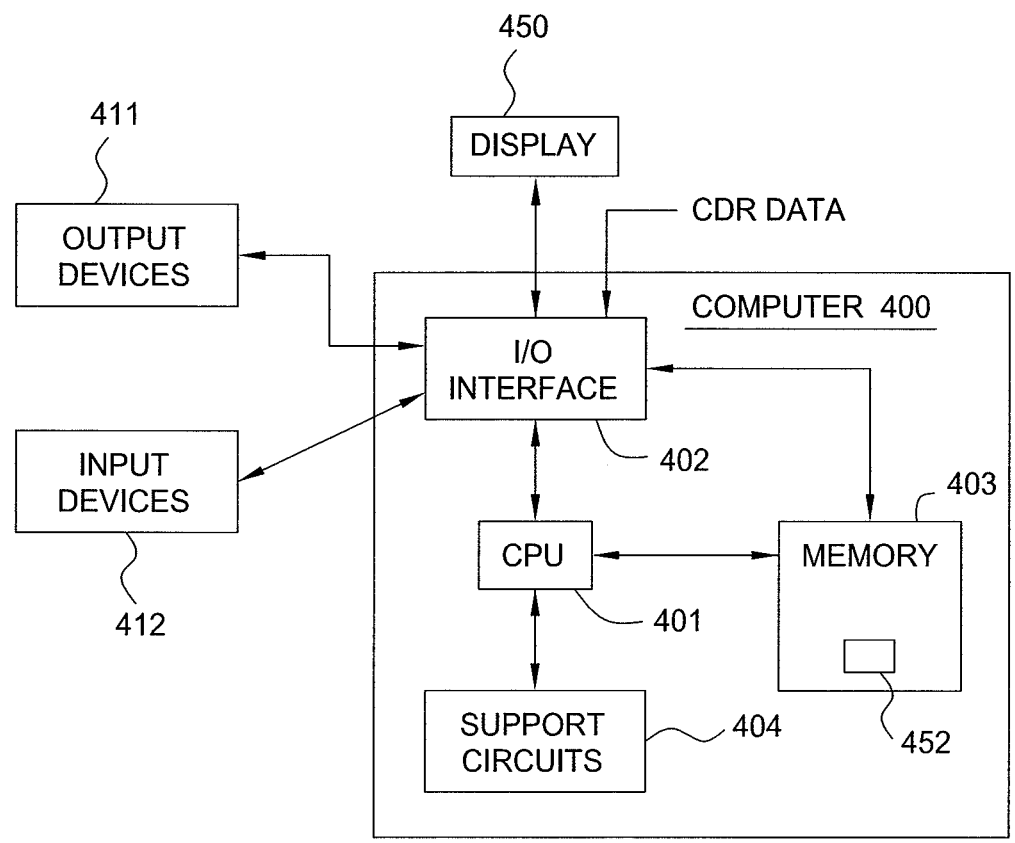
FIG. 4 is a block diagram depicting an exemplary embodiment of a computer suitable for implementing the processes and methods described herein.

FIG. 4 is a block diagram depicting an exemplary embodiment of a computer 400 suitable for implementing the processes and methods described herein. Notably, the computer 400 may be used to implement the server 210 of FIG. 2 and the method 300 of FIG. 3. The computer 400 includes a central processing unit (CPU) 401, a memory 403, various support circuits 404, and an I/O interface 402. The CPU 401 may be any type of microprocessor known in the art. The support circuits 404 for the CPU 401 include conventional cache, power supplies, clock circuits, data registers, I/O interfaces, and the like. The I/O interface 402 may be directly coupled to the memory 403 or coupled through the CPU 401. The I/O interface 402 may be coupled to various input devices 412 and output devices 411, such as a conventional keyboard, mouse, printer, and the like. In particular, the I/O interface 402 may be coupled to a display 450. The I/O interface 402 may be configured to receive CDR data from network elements in a communication network.

The memory 403 may store all or portions of one or more programs and/or data to implement the processes and methods described herein. Notably, the memory 403 may store program code 452 to be executed by the CPU 401 for performing the method 300 of FIG. 3. In this manner, the CDR data may be processed and results of the processing displayed on the display 450. In particular, data indicative of the number of blocked calls originating from unique telephone numbers may be displayed and/or data indicative of a number of unique blocked calls may be displayed on the display 450. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 400 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 403. The memory 403 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of monitoring a communication network, comprising:
identifying an occurrence of a plurality of blocked calls over a time period;
generating a plurality of consolidated call detail records for the plurality of blocked calls from call detail record data, each of the plurality of consolidated call detail records including an originating telephone number; and
processing, by a processor, the originating telephone number of each of the plurality of consolidated call detail records to identify unique originating telephone numbers for the plurality of blocked calls, by ignoring a redundant originating number.

2. The method of claim 1, further comprising:
displaying data indicative of a number of unique blocked calls in the plurality of blocked calls associated with the unique originating telephone numbers.

3. The method of claim 1, further comprising:
displaying data indicative of a number of blocked calls in the plurality of blocked calls for each of the unique telephone numbers.

4. The method of claim 1, wherein the generating the plurality of consolidated call detail records comprises:
identifying a plurality of call detail records in the call detail record data for each of the plurality of blocked calls; and
for each of the plurality of blocked calls, merging the plurality of call detail records associated therewith to produce a respective one of the plurality of consolidated call detail records.

5. The method of claim 4, wherein the identifying comprises:
determining whether a final handling code associated with each of the plurality of call detail records is indicative of a blocked call.

6. The method of claim 1, wherein the communication network comprises a packet network.

7. The method of claim 6, wherein the packet network comprises a voice-over-internet protocol network.

8. An apparatus for monitoring a communication network, comprising:

a processor; and a computer-readable medium in communication with the processor, the computer-readable medium having stored thereon a plurality of instructions, the plurality of instructions including instructions which, when executed by the processor, cause the processor to perform operations, the operations comprising:

identifying an occurrence of a plurality of blocked calls over a time period;

generating a plurality of consolidated call detail records for the plurality of blocked calls from call detail record data, each of the plurality of consolidated call detail records including an originating telephone number; and processing the originating telephone number of each of the plurality of consolidated call detail records to identify unique originating telephone numbers for the plurality of blocked calls, by ignoring a redundant originating number.

9. The apparatus of claim 8, further comprising:

displaying data indicative of a number of unique blocked calls in the plurality of blocked calls associated with the unique originating telephone numbers.

10. The apparatus of claim 8, further comprising:

displaying data indicative of a number of blocked calls in the plurality of blocked calls for each of the unique telephone numbers.

11. The apparatus of claim 8, wherein the generating the plurality of consolidated call detail records comprises:

identifying a plurality of call detail records in the call detail record data for each of the plurality of blocked calls; and merging the plurality of call detail records associated with each of the plurality of blocked calls to produce a respective one of the plurality of consolidated call detail records.

12. The apparatus of claim 11, wherein the identifying comprises:

determining whether a final handling code associated with each of the plurality of call detail records is indicative of a blocked call.

13. The apparatus of claim 8, wherein the communication network comprises a packet network.

14. The apparatus of claim 13, wherein the packet network comprises a voice-over-internet protocol network.

15. A non-transitory computer readable medium having stored thereon instructions that, when executed by a processor, cause the processor to perform operations of monitoring a communication network, the operations comprising:

identifying an occurrence of a plurality of blocked calls over a time period;

generating a plurality of consolidated call detail records for the plurality of blocked calls from call detail record data, each of the plurality of consolidated call detail records including an originating telephone number; and processing the originating telephone number of each of the plurality of consolidated call detail records to identify unique originating telephone numbers for the plurality of blocked calls, by ignoring a redundant originating number.

16. The non-transitory computer readable medium of claim 15, further comprising:

displaying data indicative of a number of unique blocked calls in the plurality of blocked calls associated with the unique originating telephone numbers.

17. The non-transitory computer readable medium of claim 15, further comprising:

displaying data indicative of a number of blocked calls in the plurality of blocked calls for each of the unique telephone numbers.

18. The non-transitory computer readable medium of claim 15, wherein the step of generating the plurality of consolidated call detail records comprises:

identifying a plurality of call detail records in the call detail record data for each of the plurality of blocked calls; and for each of the plurality of blocked calls, merging the plurality of call detail records associated therewith to produce a respective one of the plurality of consolidated call detail records.

19. The non-transitory computer readable medium of claim 18, wherein the step of identifying comprises:

determining whether a final handling code associated with each of the plurality of call detail records is indicative of a blocked call.

20. The non-transitory computer readable medium of claim 15, wherein the communication network comprises a voice-over-internet protocol network.

* * * * *